K. F. LEES.
GREASE CUP.
APPLICATION FILED JUNE 7, 1916.
1,207,303.
Patented Dec. 5, 1916.
2 SHEETS—SHEET 2.
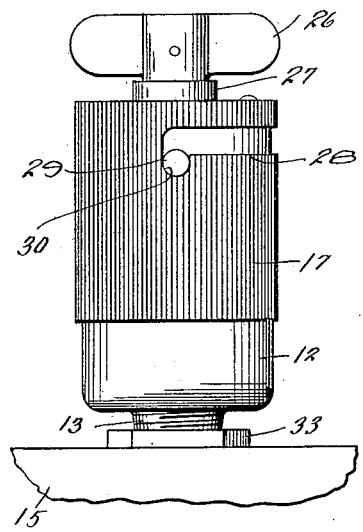
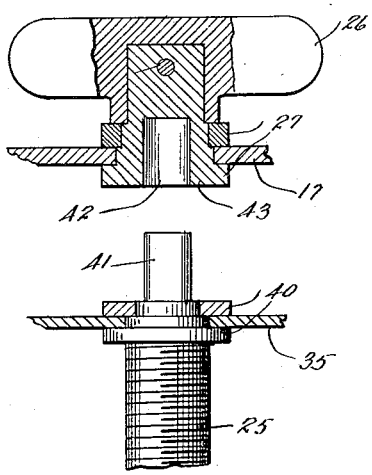
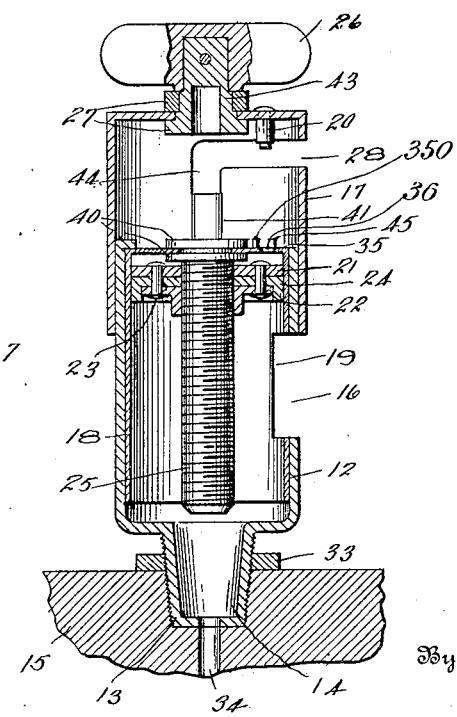
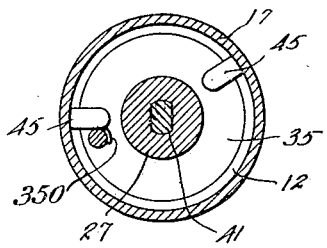
Inventor
K. F. Lees
By
Attorneys

UNITED STATES PATENT OFFICE.

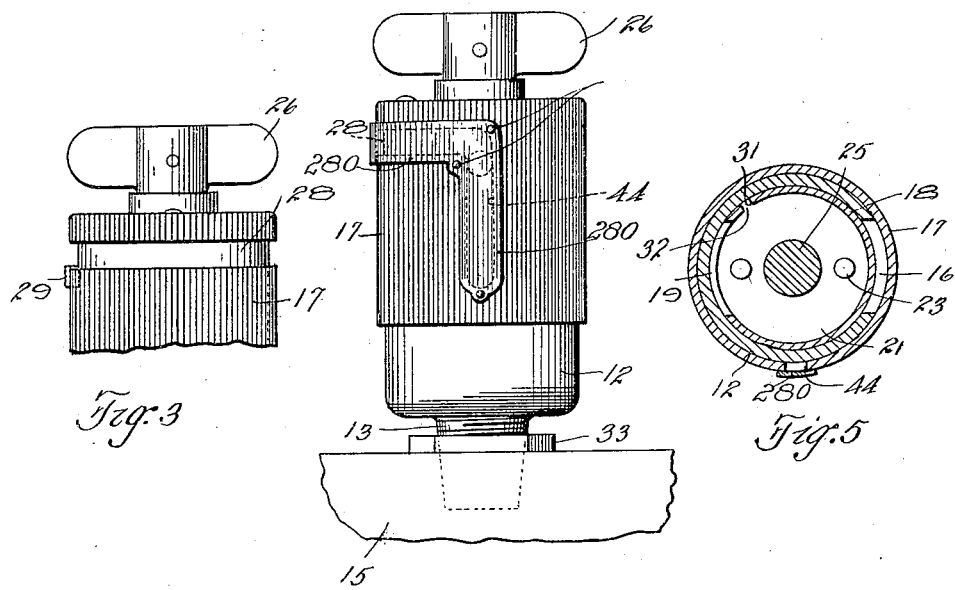
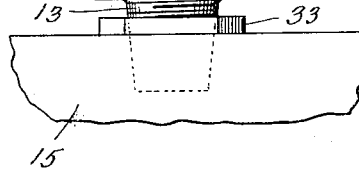
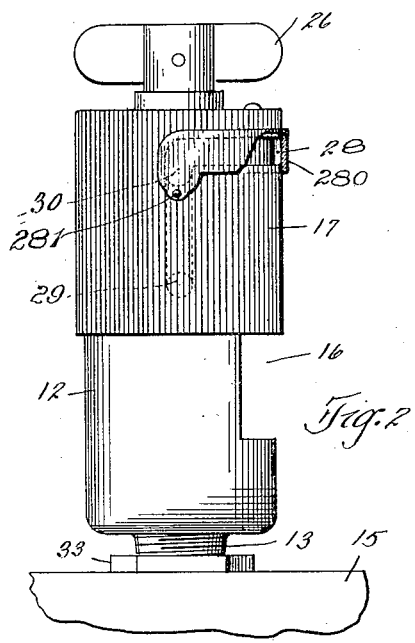
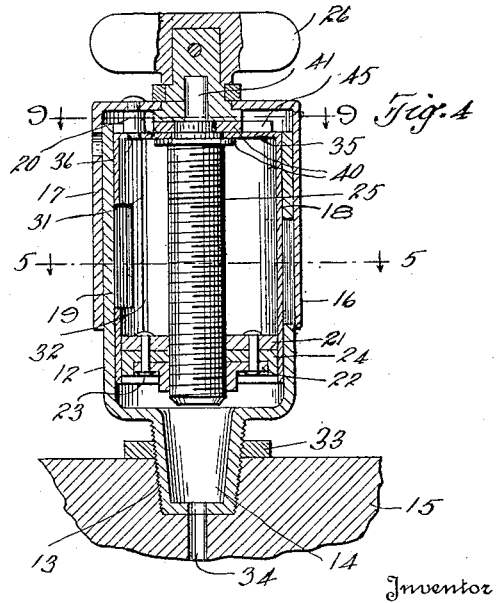

KENNETH F. LEES, OF NEW HAVEN, CONNECTICUT.

GREASE-CUP.

1,207,303.   Specification of Letters Patent.   Patented Dec. 5, 1916.

Application filed June 7, 1916. Serial No. 102,225.

*To all whom it may concern:*

Be it known that I, KENNETH F. LEES, a citizen of the United States, residing at New Haven, in the county of New Haven and State of Connecticut, have invented or discovered certain new and useful Improvements in Grease-Cups, of which the following is a specification, reference being had therein to the accompanying drawings.

This invention relates to grease cups for use in connection with machinery bearings for the purpose of supplying lubricant thereto, particularly lubricant in the form of heavy or semi-solid grease, and has for its general object the provision of an improved grease cup of a type capable of being filled from the side without the complete removal of the cap or other component part of the cup, thereby providing for increased convenience in filling and obviating the danger of loss or misplacement of the part or parts removed.

Another object of the invention is the provision of a grease cup in which the lubricant will be securely retained against all possibility of leakage, in which all filling openings are covered at the exterior of the cup when the latter is closed, and in which the construction is such that the greater the internal pressure the tighter will be all joints through which said lubricant might tend to escape.

A further object of the invention is the provision of a grease cup having no screw threads capable of becoming damaged by use, said cup, moreover, being provided with positive means for locking the same in closed condition, and said locking means being of such a character that the greater the internal pressure the more securely will the locking be accomplished.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departing from the spirit and scope thereof.

In said drawings Figure 1 is a side elevation of the grease cup showing the same closed and locked. Fig. 2 is a similar view showing the cup opened for filling. Fig. 3 is a rear elevation of the upper portion of the cup, looking from the left in Fig. 1. Fig. 4 is a central vertical section of the cup in closed condition. Fig. 5 is a transverse section taken substantially on the line 5—5, Fig. 4. Fig. 6 is a view similar to Fig. 1 viewing the cup from the opposite side. Fig. 7 is a sectional view similar to Fig. 4 showing the cup opened for filling. Fig. 8 is an enlarged detail view showing the upper or outer end of the plunger operating screw and the actuating key or handle therefor. Fig. 9 is a transverse section taken substantially on the line 9—9, Fig. 4.

The grease cup herein shown is in the nature of a modification of the grease cup shown and described in my application for Letters Patent filed April 3, 1916, Serial No. 88,499, and such features of the present cup as are described in said application are not claimed herein, being covered by the claims of said other application.

The grease cup constituting the present invention comprises a cylindrical body member 12 having an open outer or upper end and a closed inner or lower end provided with a nipple 13, said nipple having a central bore 14 constituting a discharge opening. The nipple 13 is provided with exterior screw threads to engage, in the usual manner, the interior threads of a suitable opening 34 in the bearing 15, with which opening said bore 14 communicates. The body member 12 is provided with a lateral filling opening 16 which, when the cup is closed, is covered by the cylindrical portion of a cap 17, which cap also closes the open outer end of said body member. Within said body member is a sleeve 18 having a lateral opening 19 which, when the cup is opened, is adapted to register with the filling opening 16 in the body 12. Said sleeve as herein shown is provided with an end or head 35 having an aperture 36 (see particularly Fig. 7) adapted to receive the end of a stud or pin 20 carried by the cap 17 when said cap is in position to close the cup. Adjacent said aperture 36, said head 35 is provided with an upstanding lug 350 for a purpose hereinafter explained.

Slidably mounted within the sleeve 18 is a plunger or piston which, as herein shown, comprises a pair of metallic washers 21 and 22 permanently secured together by rivets 23 and clamping between them a leather or other flexible washer 24 forming a tight joint with the sleeve 18. The plunger is operated or moved longitudinally of the cup, to force the grease therefrom through the discharge opening 14, by means of a stem or spindle 25 in threaded engagement with the plunger washer 22 and journaled in a central opening in the head 35 of the sleeve 18, said stem or spindle being held against longitudinal movement with respect to said sleeve by means of flanges or fixed collars 40 which engage opposite sides of said head 35. Said stem or spindle is provided at its outer end with a flattened or non-circular shank or tang 41 which, when the cup is closed, is received within a correspondingly formed socket 42 in a hub 43, rotatably mounted in the end of the cap 17 and held permanently assembled therewith by means of flanges or fixed collars 27 engaging opposite sides of said end, said hub having pinned or otherwise fixed thereto a key or handle 26 by means of which the operating stem or spindle 25 may be actuated or turned from the exterior of the cup when the latter is closed.

The cap 17 engages the exterior of the body 12 with a close sliding fit and is adapted for both rotary and axial movement on said body. Said cap is formed with an angular slot comprising a circumferential portion 28 connecting at one end with a longitudinal portion 44 and having at the opposite end, at its inner or lower side, a notch 30.

29 denotes a stud projecting from the body 12 and received in the slot in the cap 17, whereby said cap is guided for successive axial and rotary movements on said body. The length of the circumferential portion 28 of the slot is preferably such as to provide for an angular movement of approximately 180°, while the length of the longitudinal portion 44 thereof is such as to provide for an axial or longitudinal movement at least equal to the length of the filling opening 16 longitudinally of the body, so that as said cap is moved longitudinally of the body it is caused to cover or uncover said filling opening. Engagement of the stud 29 with the inner or lower end of the longitudinal portion 44 of the slot prevents complete separation or removal of the cap 17 when the cup is open. The position of the longitudinal portion 44 of the slot, relative to the circumferential portion 28 thereof, as also the relative positions of the stud 29 and filling opening 16, are such that in no position of the cap 17 does any portion of said slot intersect or pass over said opening.

The slot 28—44 may, if desired, be closed, at the exterior of the cup, by a combined name and cover plate 280 (shown in Figs. 1, 2 and 5 but omitted in the other figures) made slightly larger than said slot and riveted, as at 281, to the exterior of the cap 17.

The sleeve 18 is preferably formed of relatively thin stock and engages the interior of the body 12 with a close sliding fit. Said sleeve is freely rotatable within said body to carry the opening 19 into and out of register with the opening 16, but is permanently retained therein by means of inwardly projecting lugs 45 (see particularly Fig. 9) on the upper or outer end of said body, which lugs engage the head 35 of said sleeve. The length of the sleeve 18 is slightly less than the distance between the inner or lower end of the body 12 and the lugs 45, whereby said sleeve is permitted a limited longitudinal movement within said body corresponding to the longitudinal movement of the cap 17 necessary to engage and disengage the stud 29 and notch 30. Said lugs 45, by engagement with the pin or stud 20, serve also to position said pin or stud for engagement with the aperture 36 in the head 35 after disengagement of said parts. This positioning action is, of course, supplementary to the positioning action of the pin 29 in the slot 28—44, and therefore, while advantageous, is not essential. It will be observed, however, that, when the cup is open, and the pin 20 consequently disengaged from the aperture 36, engagement of the lug 350 with the adjacent lug 45 will prevent accidental turning of the sleeve 18 into a position which would interfere with the reengagement of said pin and aperture.

The sleeve 18 and plunger are connected by suitable means permitting relative longitudinal movement while holding said plunger against rotation with respect to said sleeve, thereby permitting operation of said plunger by the spindle 25, as above explained. As herein shown said means comprises a longitudinal slot 31 in said sleeve 18 which receives a lug 32 (see Fig. 5) on the plunger washer 21, said slot also performing another function as hereinafter explained.

In order that the cup may be held in an angular position in which the filling opening 16 is most conveniently accessible, as also to prevent said cup from jarring loose from the bearing, there is provided on the threaded nipple 13 a lock nut 33 engaging the surface of the bearing 15.

The normal or closed condition of the cup is shown in Figs. 1, 4 and 6, the opening 19 in the sleeve 18 being in a position circumferentially of the cup diametrically opposite the filling opening 16 in the body 12, although slightly above the same axially of the cup, due to the engagement of the pin 29 in the notch 30 and the opening 16 being covered by the cap 17. To open the cup for filling, the spindle 25 (whose tang 41 at this time engages the socket 42 in the hub 43) is operated by the handle 26 to carry the plunger to its outermost position, as shown in Fig. 7. The cap 17 is then depressed a sufficient distance to free the stud 29 from the notch 30 and thereafter rotated through approximately 180°, the stud 29 traversing the circumferential portion 28 of the slot in said cap and being brought into alinement with the longitudinal portion 44 of said slot. As the cap is thus rotated, the sleeve 18, by reason of the engagement of the pin or stud 20 with the aperture 36, is rotated with it, thereby bringing the opening 19 into register with the opening 16. Finally the cap is moved longitudinally outwardly or upwardly to uncover the filling opening 16, the stud 29 at this time traversing the longitudinal portion 44 of the slot. This final movement of the cap is permitted by the disengagement of the stud 20 from the aperture 36 and the disengagement of the tang 41 from the socket 42, the sleeve 18 being held against longitudinal movement by the lugs 45. The parts being now in the position shown in Figs. 2 and 7, lubricant is introduced through the opening 16 until the cup is completely filled. The cap is thereupon moved inwardly and downwardly to again cover the opening 16 and to reëngage the stud 20 with the aperture 36 and the tang 41 with the socket 42 (this reëngagement being facilitated by the positioning action of one of the lugs 45 upon the stud 20 and lug 350) and is thereafter rotated into its initial angular position, carrying with it the sleeve 18 and moving the opening 19 therein circumferentially out of register with the filling opening 16, said rotary movement also locking the cap against outward axial movement. Finally, if necessary, the cap 17 is given a slight outward pull to cause the stud 29 to enter the notch 30, thereby locking the cup in its fully closed position, that is to say, locking the cap against rotary movement. Under ordinary circumstances, however, it is found that the pressure exerted by the grease on the interior of the cup when the latter is closed, which pressure is transmitted through the head 35 and flanges 40 and 27 to the cap 17, is sufficient to cause said stud to enter said notch. In this connection it is to be observed that the greater the internal pressure upon the cup, the tighter will the stud 29 be held in the notch 30, and the more securely will the cup be locked in closed position.

In devices of this character considerable pressure is frequently required in order to force the lubricant into the bearing, particularly when the latter is badly clogged up, and, in grease cups as heretofore constructed, considerable difficulty has been encountered in preventing the escape of lubricant through the joints of the cup when subjected to this pressure. In the present cup, however, the sleeve 18, body 12, and cap 17 coöperate to provide a multiple seal against the escape or leakage of the lubricant from the cup. In order to escape from the cup, when closed, it would be necessary for said lubricant to travel through approximately 180° circumferentially of the cup, from the opening 19 to the opening 16, and between the sleeve 18 and body 12, and thereafter escape from beneath the cap 17 between the same and the body. If the parts be properly fitted, it is found that this provision is amply sufficient to prevent escape of lubricant, even when the latter is placed under considerable pressure by the action of the plunger. It will, however, be observed that, by reason of the slot 31 in the sleeve 18, as also by reason of the thin and rather flexible stock of which said sleeve is composed, this sleeve is rendered expansible, so that under internal pressure it is forced into closer engagement with the interior of the body 12, thereby further resisting the escape of lubricant, this resistance being increased in proportion to the increase in the internal pressure tending to cause such escape.

It will be seen that, when the cup is closed, there are no uncovered openings adapted to collect foreign matter which might find its way into the interior of the cup when the latter is again opened. Even if the cover plate 280 be omitted, the only exposed opening at the exterior of the cup, when the latter is closed, is the slot 28—44 which, however, never passes over the filling opening, and which is cleaned at each operation by the stud 29.

It will also be seen that the device has no screw threads which are likely to become damaged or worn and thereby interfere with the proper operation. The only screw threads employed in the device are those on the nipple 13 which, however, under normal conditions, is never removed after having once been screwed into place, and those on the spindle 25 which is always protected and lubricated.

It will furthermore be seen that the parts are all permanently connected or assembled, it being unnecessary and impossible completely to remove any of them under normal conditions of use, so that all danger of loss of loose parts, and all difficulty of replacement of such parts when removed, are entirely obviated.

Having thus described my invention I claim and desire to secure by Letters Patent:

1. A grease cup comprising a body having a lateral filling opening, a cap on the exterior of said body, and means for guiding said cap for successive axial and rotary movements, said axial movement serving to carry the edge of said cap over or away from said opening to cover or uncover the same, and said rotary movement serving to lock said cap against axial movement or to unlock the same.

2. A grease cup comprising a body having a lateral filling opening, a cap movable on said body to cover and uncover said opening and having an angular slot closed at both ends, and a stud projecting from said body and engaging said slot.

3. A grease cup comprising a body having a lateral filling opening, a cap movable on said body to cover and uncover said opening, said cap having a slot comprising a longitudinal portion and a circumferential portion communicating at one end with said longitudinal portion, and a stud projecting from said body and engaging said slot, there being a notch communicating with the circumferential portion of said slot to receive said stud and lock said cap in position to cover said opening.

4. A grease cup comprising a body having a lateral opening, a sleeve within said body having an opening, said sleeve being movable to bring the opening therein into and out of register with the opening in said body, a cap movably mounted on the exterior of said body and operatively connected with said sleeve, and means for retaining said sleeve within said body.

5. A grease cup comprising a body having a lateral opening, a sleeve within said body having a lateral opening, said sleeve being rotatable in said body to bring the opening therein into and out of register with the opening in said body, and inwardly projecting lugs on the outer end of said body engaging the outer end of said sleeve to retain said sleeve within said body.

6. A grease cup comprising a body having a filling opening, a sleeve within said body having an opening, said sleeve being movable to bring the opening therein into and out of register with the opening in said body, a cap movably mounted on the exterior of said body, and disengageable means connecting said cap and sleeve for movement in unison.

7. A grease cup comprising a body having a lateral filling opening, a cap movable on the exterior of said body to cover and uncover said opening, means for guiding said cap for successive axial and rotary movements, a sleeve within said body having a lateral opening and rotatable within said body to bring said openings into and out of register, and means connecting said cap and sleeve for rotation in unison, said means being disengageable when said cap is moved axially.

8. A grease cup comprising a body having a filling opening, a sleeve within said body having a lateral opening and a head provided with an aperture, said sleeve being movable to bring the lateral opening therein into and out of register with the opening in said body, and a cap movably mounted on the exterior of said body and having a pin adapted to engage and disengage said aperture.

9. A grease cup comprising a body having a filling opening, a sleeve within said body having an opening, said sleeve being movable to bring the opening therein into and out of register with the opening in said body, a cap movably mounted on the exterior of said body, disengageable means connecting said cap and sleeve for movement in unison, and means for relatively positioning said cap and sleeve to permit engagement of said connecting means.

10. A grease cup comprising a body having a filling opening, a sleeve within said body having an opening, said sleeve being movable to bring the opening therein into and out of register with the opening in said body, a cap movably mounted on the exterior of said body and provided with a pin adapted to engage said sleeve, and a lug on said body adapted to engage said pin to position the same for engagement with said sleeve.

11. A grease cup comprising a body having a lateral filling opening, a sleeve within said body having a lateral opening, said sleeve being rotatable to bring the opening therein into and out of register with the opening in said body, a cap mounted on the exterior of said body for both rotary and axial movement to cover and uncover said opening, means for holding said sleeve against axial movement with said cap when the latter is moved to uncover said filling opening, and means connecting said cap and sleeve for rotation in unison, said last named means being disengaged when said cup is moved axially.

12. A grease cup comprising a body having a lateral filling opening, a sleeve within said body having a lateral opening and a lug, said sleeve being rotatable in said body to bring the opening therein into and out of register with the opening in said body, a cap mounted on the exterior of said body for both rotary and axial movement to cover and uncover said opening, a pin on said cap adapted to engage and rotate said sleeve when said cap is rotated and to disengage said sleeve when said cap is moved axially, and a lug on the outer end of said body engaging the outer end of said sleeve to retain said sleeve within said body, said lug being also adapted to engage said pin and the lug on said sleeve to relatively position said cap and sleeve for engagement of said pin with said sleeve.

13. A grease cup comprising a body having a filling opening, a sleeve within said body having an opening, said sleeve being movable to bring the opening therein into and out of register with the opening in said body, a cap movably mounted on the exterior of said body, disengageable means connecting said cap and sleeve for movement in unison, a plunger within said sleeve, operating means for said plunger carried by said sleeve, an actuator for said operating means carried by said cap, and disengageable means connecting said operating means and actuator.

14. A grease cup comprising a body having a lateral filling opening, a sleeve within said body having a lateral opening and an end head, said sleeve being rotatable to bring the opening therein into and out of register with the opening in said body, a cap mounted on the exterior of said body for both rotary and axial movement, disengageable means connecting said cap and sleeve for rotation in unison, a plunger within said sleeve, an operating screw for said plunger journaled in said head and having a non-circular tang, and a key journaled in said cap and having a non-circular socket in which said tang is received.

15. A grease cup comprising a body having a filling opening, an expansible sleeve within said body having an opening, said sleeve being movable to bring the opening therein into and out of register with the opening in said body, a cap movably mounted on the exterior of said body, and disengageable means connecting said cap and sleeve for movement in unison.

16. A grease cup comprising a body having a filling opening, a sleeve within said body having an opening and a projecting lug, said sleeve being movable to bring the opening therein into and out of register with the opening in said body, a cap movably mounted on the exterior of said body, disengageable means connecting said cap and sleeve for movement in unison, and a lug on said body engaged by the lug on said sleeve for relatively positioning said cap and sleeve to permit engagement of said connecting means.

17. A grease cup comprising a body having a lateral filling opening, a member movably mounted on said body and having a slot closed at the exterior of said member, a stud projecting from said body and engaging said slot to guide said member for movement on said body to cover and uncover said filling opening, and a sleeve within said body having an opening, said sleeve being movable to bring the opening therein into and out of register with the opening in said body.

18. A grease cup comprising a body having a lateral filling opening, a member movably mounted on said body and having a slot, a stud projecting from said body and engaging said slot to guide said member for movement on said body to cover and uncover said filling opening, a cover plate secured to said member for closing said slot at the exterior of said member, and a sleeve within said body having an opening, said sleeve being movable to bring the opening therein into and out of register with the opening in said body.

19. A grease cup comprising a body having a lateral filling opening, a cap longitudinally movable on the exterior of said body to cover and uncover said opening, means for guiding said cap for successive axial and rotary movements, a sleeve within said body having a lateral opening and rotatable within said body to bring said openings into and out of register, and means for connecting said cap and sleeve for rotation in unison.

In testimony whereof I affix my signature.

KENNETH F. LEES.

Copies of this patent may be obtained for five cents each, by addressing the "Commissioner of Patents, Washington, D. C."